US008176626B2

(12) United States Patent
Kirst

(10) Patent No.: US 8,176,626 B2
(45) Date of Patent: May 15, 2012

(54) TERMINAL REEL CART

(75) Inventor: Michael A. Kirst, Pewaukee, WI (US)

(73) Assignee: Artos Engineering Company, Brookfield, WI (US)

( * ) Notice: Subject to any disclaimer, the term of this patent is extended or adjusted under 35 U.S.C. 154(b) by 0 days.

(21) Appl. No.: 12/782,352

(22) Filed: May 18, 2010

(65) Prior Publication Data

US 2010/0293780 A1 Nov. 25, 2010

Related U.S. Application Data

(60) Provisional application No. 61/179,426, filed on May 19, 2009.

(51) Int. Cl.
*B23P 19/00* (2006.01)

(52) U.S. Cl. ............... 29/760; 29/33 M; 29/753; 29/759

(58) Field of Classification Search .................. 29/33 M, 29/753, 759, 760
See application file for complete search history.

(56) References Cited

U.S. PATENT DOCUMENTS

| | | | | | |
|---|---|---|---|---|---|
| 4,290,179 | A | * | 9/1981 | Bakermans et al. | 29/33 M |
| 4,363,167 | A | * | 12/1982 | Boutcher et al. | 29/863 |
| 4,581,796 | A | * | 4/1986 | Fukuda et al. | 29/33 M |
| 5,078,001 | A | * | 1/1992 | Bakermans | 72/324 |
| 5,127,159 | A | * | 7/1992 | Kudo et al. | 29/863 |
| 5,765,278 | A | * | 6/1998 | Koike et al. | 29/753 |
| 2004/0007041 | A1 | | 1/2004 | Imgrut et al. | |

FOREIGN PATENT DOCUMENTS

WO 2006136930 12/2006

* cited by examiner

*Primary Examiner* — Carl Arbes

(74) *Attorney, Agent, or Firm* — Andrus, Sceales, Starke & Sawall, LLP

(57) ABSTRACT

A terminal reel cart that supports a reel of terminals and a terminal applicator such that the terminal applicator can be loaded with the strip of terminals and moved into position relative to a wire processing system. The terminal reel cart supports the reel of terminals and a terminal applicator. The reel cart includes a plurality of wheels that allow the cart to be easily moved throughout a processing facility. The reel cart includes a paper take up reel that is driven by a motor and collects the paper backing from the strip of terminals. The paper take up reel is driven by a drive motor on the wire processing system.

17 Claims, 6 Drawing Sheets

TERMINAL REEL CART

CROSS-REFERENCE TO RELATED APPLICATION

The present application is based on and claims priority to U.S. Provisional Patent Application Ser. No. 61/179,426 filed on May 19, 2009.

BACKGROUND OF THE INVENTION

The present disclosure generally relates to a reel cart for use with a wire processing system. More specifically, the present disclosure relates to the terminal reel cart that allows a terminal applicator to be mounted to the reel cart, loaded with a strip of terminals and positioned for use with the wire processing system.

Presently, many different types of terminal applicators can be used with a wire processing system. When different terminals are to be crimped onto the ends of the wire being processed, the terminal applicator is removed from the wire processing system and another terminal applicator is installed. In many wire processing facilities, there may be more than 20 applicators that can be used with the wire processing machine.

When a new applicator is installed, a strip of terminals must be fed through the applicator from a supply reel. The supply reel is typically mounted directly to the machine. This requires the operator to mount the terminal reel to the machine, mount the applicator and feed the terminal strip through the applicator, which requires down time of the wire processing machine.

SUMMARY OF THE INVENTION

The present disclosure relates to a terminal reel cart mounted on a series of caster wheels that can be moved about a manufacturing facility and used with one or more wire processing systems. The terminal reel cart includes a terminal reel mounted to a support shaft. The support shaft is received within an open slot formed within the support body of the terminal reel cart. The support shaft is held in place by a retention mechanism including a pair of locking bars contained on each side of the terminal reel cart.

The terminal reel cart includes a mounting plate configured to receive and retain a terminal applicator. When the terminal applicator is supported on the mounting plate of the terminal reel cart, the continuous strip of terminals can be fed through the terminal applicator from the terminal reel supported by the terminal reel cart. The strip of terminals pass over a guide plate that is pivotally attached to the terminal reel cart. When the strip of terminals are installed into the terminal applicator, the entire terminal reel cart can be moved as a unit to a desired wire processing system during changeover of the terminal applicators. Since the strip of terminals is already installed into the terminal applicator, the terminal applicator can be removed from the mounting plate and installed into the wire processing system without having to thread the strip of terminals through the terminal applicator.

In one embodiment of the disclosure, the mounting plate includes a magnetic holder to magnetically hold a terminal applicator in place. Other types of holding devices are contemplated as being within the scope of the present disclosure.

The terminal guide included on the terminal reel cart is pivotally mounted such that the terminal guide can guide the strip of terminals as the applicator is moved from the mounting plate to installation within the wire processing system.

The terminal guide includes a switch connected to the wire processing system to provide a signal indicating whether the strip of terminals is passing over the guide plate. When the strip of terminals is missing, the system determines that the terminal reel needs to be replaced.

The terminal reel cart includes a paper take up reel that accumulates the paper backing for the strip of terminals. In one embodiment, the paper take up reel is supported along a drive shaft. The drive shaft is rotatably coupled to a drive wheel through a clutch assembly. Rotation of the drive wheel causes rotation of the center spool of the paper take up reel.

When the terminal reel cart is installed at the wire processing system, the drive wheel of the terminal reel cart frictionally engages a drive wheel coupled to a drive motor of the wire processing system. The frictional interaction between the drive wheel of the wire processing system and the drive wheel of the terminal reel cart allows the wire processing system to control the operation of the paper take up reel. Alternatively, a separate drive motor could be included on the terminal reel cart.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
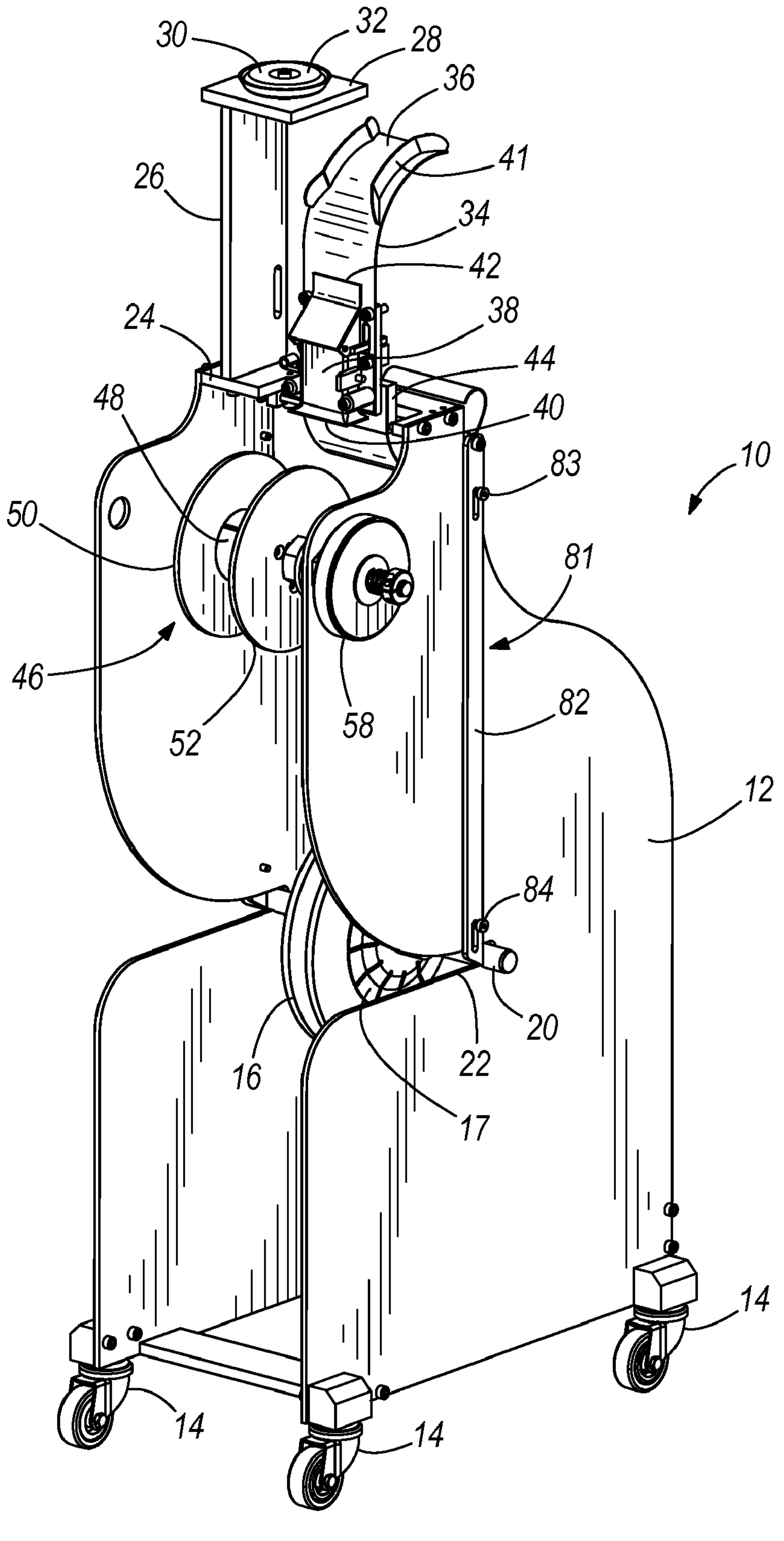
FIG. 1 is a front perspective view of a terminal reel cart that is used to support a reel of terminals and a terminal applicator.

FIG. 1 illustrates a terminal reel cart 10 constructed in accordance with the present disclosure. The terminal reel cart 10 includes a support body 12 mounted to a series of caster wheels 14. The caster wheels 14 allow the entire terminal reel cart 10 to be moved to a desired location in a working environment.

The terminal reel cart 10 supports a terminal reel 16 that includes a continuous strip of terminals (not shown) wound around the terminal reel 16. The reel 16 is positioned between a pair of support plates 17 and is rotatably mounted to a shaft 20 that is received within a slot 22 formed in the support body 12.

Figure 4:
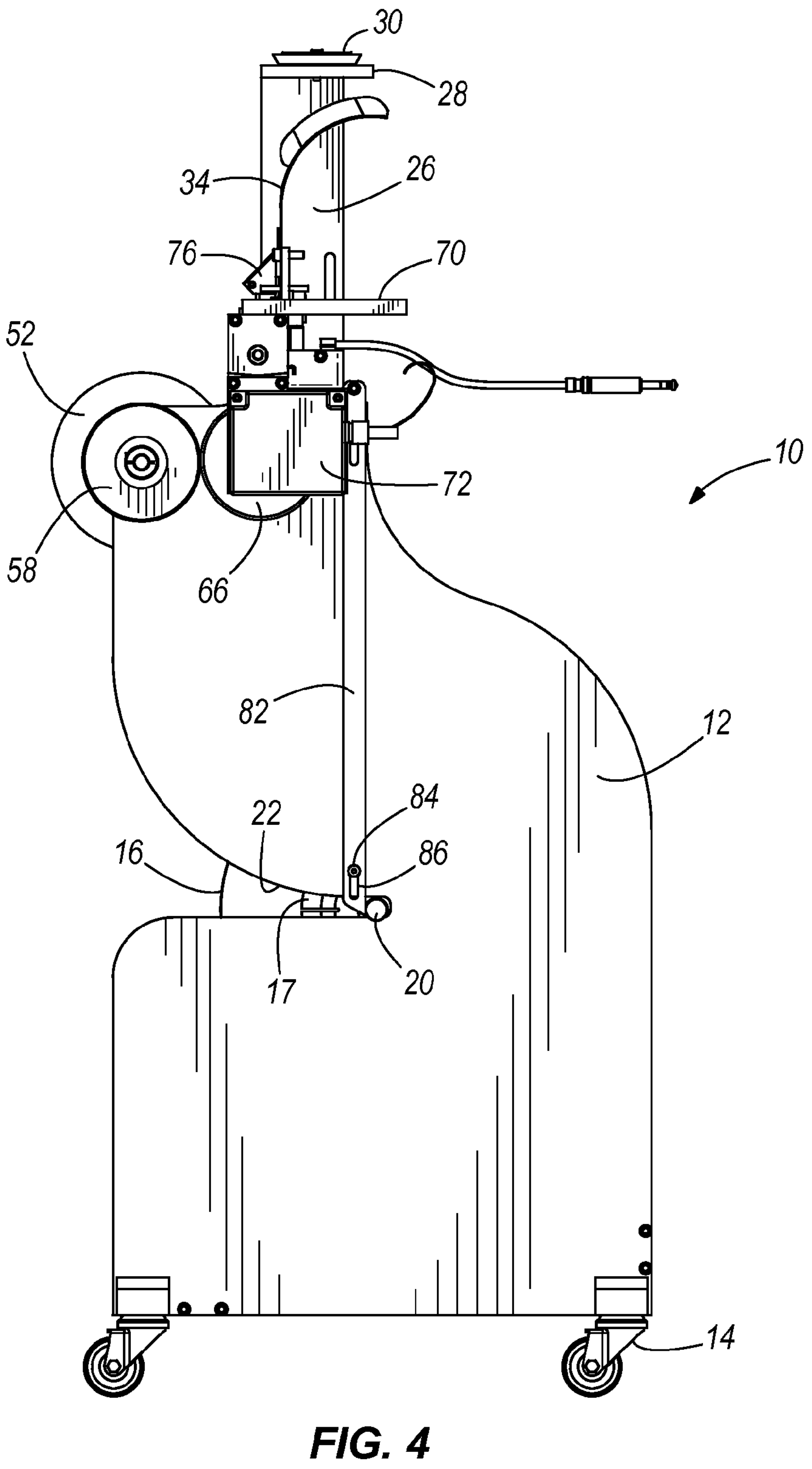
FIG. 4 is a side view of the terminal reel cart.

As illustrated in FIG. 1, the support body 12 includes a generally horizontal cross support 24 that in turn supports a vertical bracket 26. The vertical bracket 26 in turn supports a horizontal mounting plate 28. In the embodiment shown in the Figures, the mounting plate 28 supports a terminal applicator holder, which in FIG. 4 is a magnetic holder 30. The magnetic holder 30 allows various types of terminal applicators to be supported by the reel cart 10. Although not shown in FIGS. 1 and 2, the terminal applicator holder can support any number of different types of terminal applicators. The magnetic holder 30 shown in FIGS. 1 and 2 securely supports the terminal applicator such that the terminal applicator can be moved along with the terminal reel cart 10. When the terminal reel cart 10 is positioned adjacent to a wire processing system, the terminal applicator can be removed from the magnetic holder 30 and installed within the wire processing system as is well known. The magnetic holder 30 provides a secure point of attachment for the terminal applicator such that the terminal applicator can be moved along with the reel of terminals 16 rotatably supported on the shaft 20.

In the embodiment of FIG. 1, the terminal applicator holder is shown as a magnetic holder 30 having a generally circular magnet 32 that interacts with the base plate of a terminal applicator. However, the magnetic holder 30 could be removed and replaced with different types of terminal mounting assemblies, depending upon the actual type of terminal applicator used with the terminal reel cart 10.

Referring back to FIG. 1, the terminal reel cart 10 includes a terminal guide 34 that is pivotally mounted to the cross support 24. The terminal guide 34 includes a curved guide plate 36 positioned above a terminal chute 38 having an open bottom end 40 and an open top end 42. The strip of terminals pass through the terminal chute 38 and travel over the curved guide plate 36 between the chute walls 41.

Figure 5:
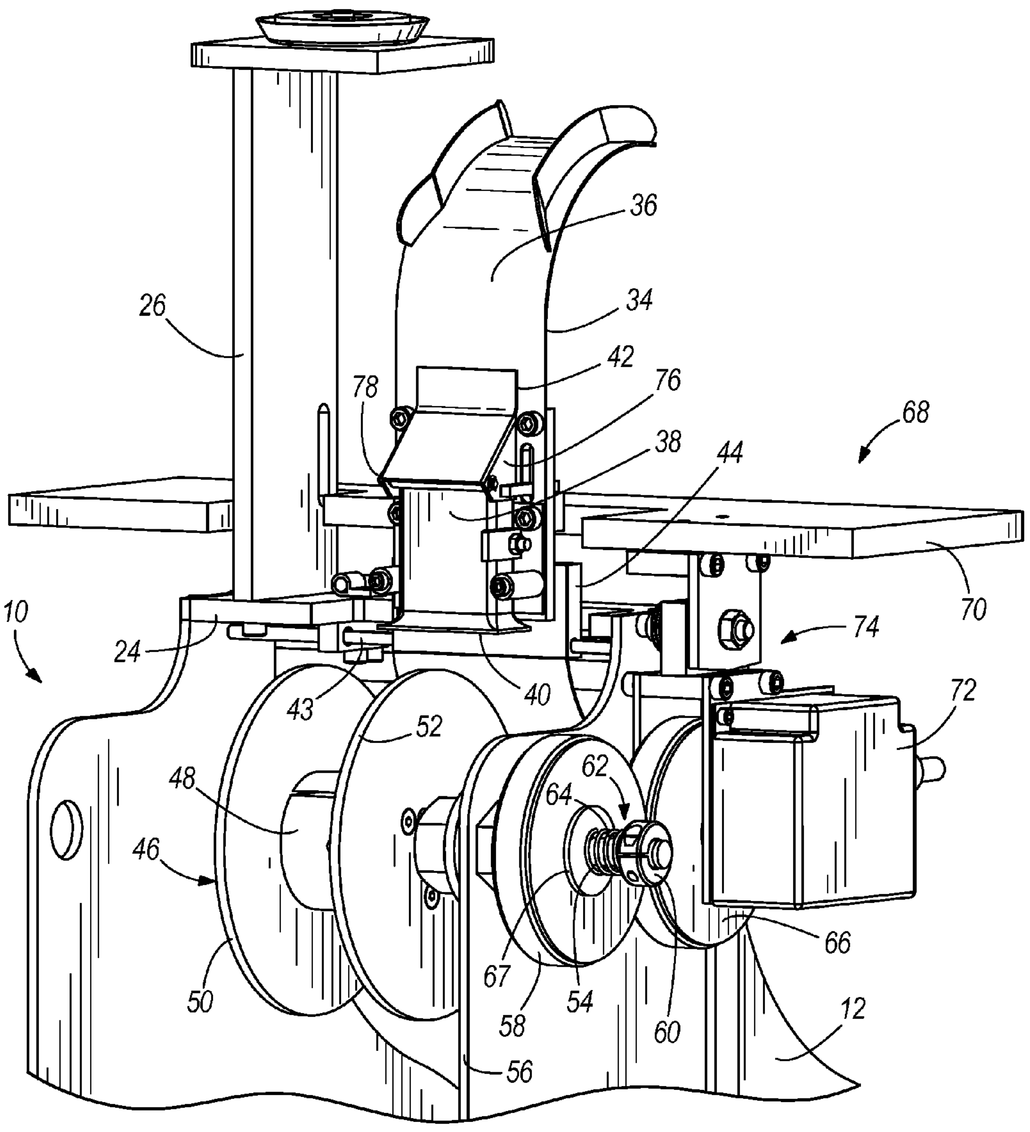
FIG. 5 is a magnified view illustrating the interaction between the terminal reel cart and a drive motor of the support table.

As shown in FIG. 5, the entire terminal guide 34 is pivotally mounted to the cross support 24 by a pivot rod 43 that passes through mounting block 44. The rotation of the mourning block 44 about the pivot rod 43 allows the entire terminal guide 34 to pivot about a horizontal axis.

When a terminal applicator is supported along the magnetic holder 30, the terminal guide 34 pivots rearwardly such that the strip of terminals pass through the terminal chute 38 such that the strip of terminals can be loaded into the terminal applicator when the terminal applicator is supported on the magnetic holder 30. When the terminal applicator is removed from the magnetic holder 30 and installed in the wire processing system, as will be described, the terminal guide 34 pivots about the horizontal axis such that the strip of terminals are supported during the installation of the terminal applicator within the wire processing system. The pivoting movement of the terminal guide 34 thus allows the strip of terminals to be supported when the terminal applicator is moved from the terminal reel cart 10 to the wire processing system.

Figure 2:
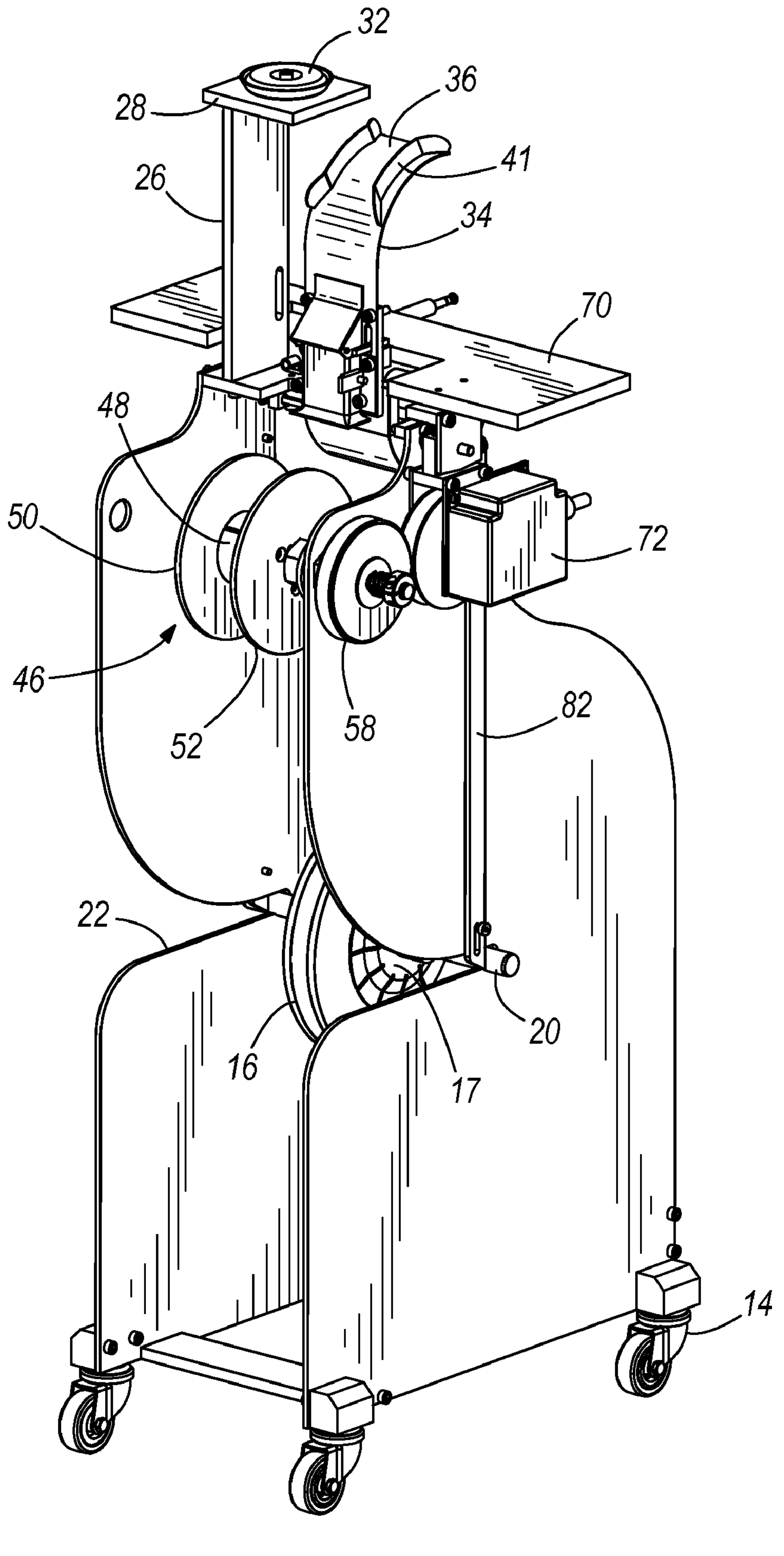
FIG. 2 is a front perspective view of the terminal reel cart as positioned adjacent to a support table of a wire processing system.

As illustrated in FIGS. 1 and 2, the terminal reel cart 10 includes a paper take up reel 46. Since the strip of terminals often includes a paper backing strip, the paper take up reel 46 receives the paper backing and collects the backing for later disposal. The paper take up reel 46 includes a center spool 48 and a pair of spaced, circular plates 50, 52.

Referring now to FIG. 5, the center spool 48 is supported by a shaft 54 that extends through sidewall 56 of the support body 12. Shaft 54 extends through a drive wheel 58 and receives a locking collar 60 of a clutch mechanism 62. The clutch mechanism 62 includes a spring member 64 and a support plate 67. The clutch mechanism 62 rotatably connects the shaft 54 and the drive wheel 58 while allowing for slippage between the two mechanisms when required. As illustrated in FIG. 5, the drive wheel 58 engages a drive wheel 66 of the wire processing system 68. The wire processing system 68 includes a support table 70 that supports the various wire processing equipment used to apply terminals to strips of wire or other processing equipment.

A drive motor 72 is mounted beneath the support table 70 through a mounting arrangement 74. The drive motor 72 in the embodiment shown in FIG. 5 is an electric motor that is coupled to the control unit for the wire processing system and selectively controls the operation of the drive wheel 66. The mounting arrangement 74 allows the position of the drive wheel 66 to be adjusted for correct alignment with the drive wheel. When the terminal reel cart 10 is mounted adjacent to the wire processing system 68, the drive wheel 58 physically engages the drive wheel 66 such that the driven rotation of the drive wheel 66 imparts similar rotation to the drive wheel 58. Rotation 58 of the terminal reel cart 10 of the drive wheel 58 causes corresponding rotation of the center spool 48 through the clutch mechanism 62. As described previously, rotation of the center spool 48 allows the terminal reel cart to take up the paper backing material for the strip of terminals being applied.

Figure 3:
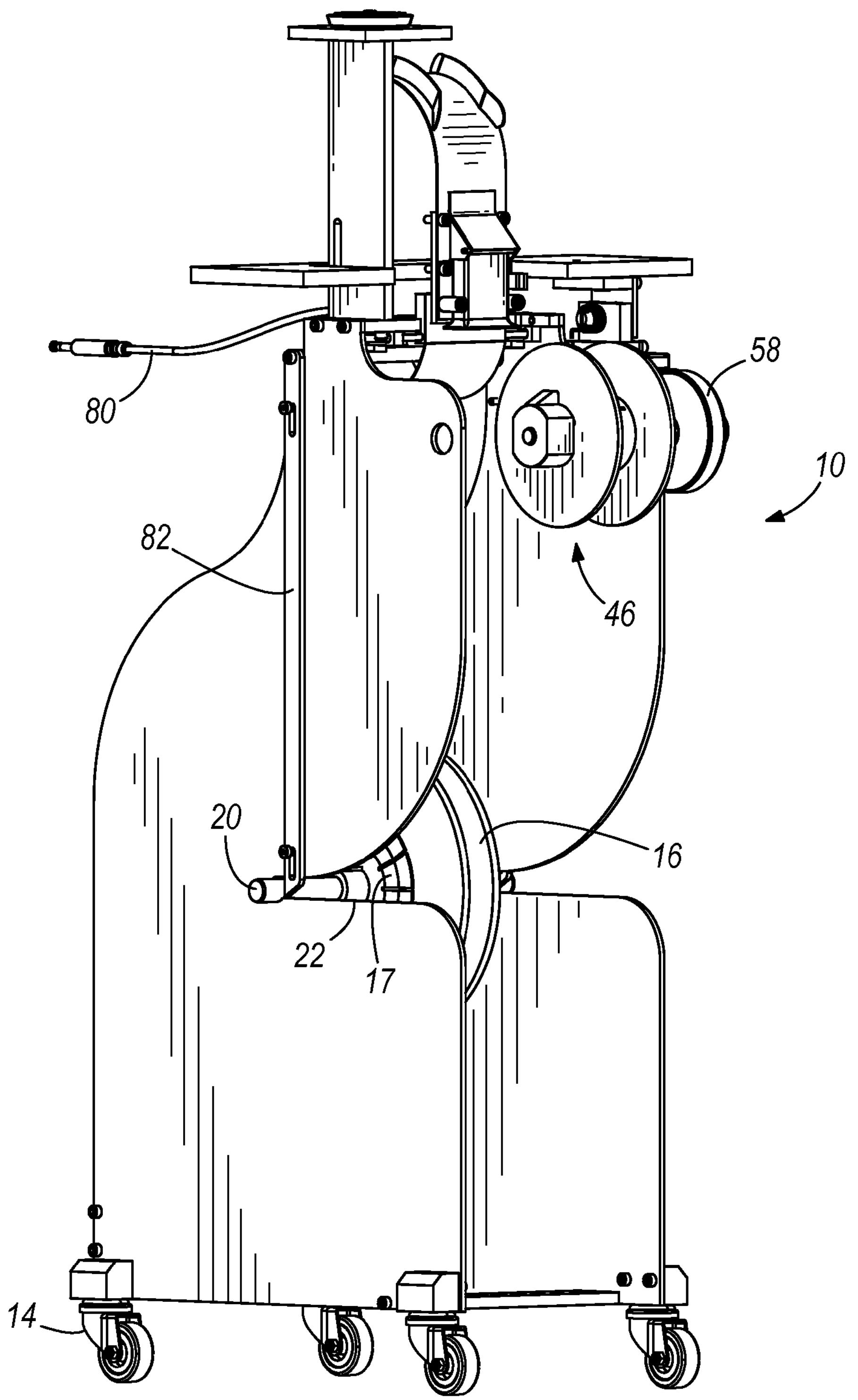
FIG. 3 is a rear perspective view illustrating the terminal reel cart positioned adjacent to the support table.

As illustrated in FIG. 5, the terminal guide 34 includes a switch mechanism 76. The switch mechanism 76 is rotatably mounted about a pair of pivot pins 78. When terminals are passing through the terminal chute 38, the switch mechanism 76 pivots about the pivot pins 78. When a strip of terminals are no longer present, the switch mechanism 76 returns to the position shown in FIG. 5. In this position, the switch mechanism 76 provides an indication to the wire processing system that terminals are no longer being fed to the applicator of the wire processing system. The switch mechanism 76 is connected to the wire processing system via a one-quarter inch phone jack or other type of connector. The connection to the wire processing system is shown in FIG. 3 as the attachment cord 80. The attachment cord 80 is a reinforced member that allows the terminal reel cart 10 to be connected to the wire processing system such that information from the switch mechanism 76 can be relayed to the wire processing system.

Figure 6:
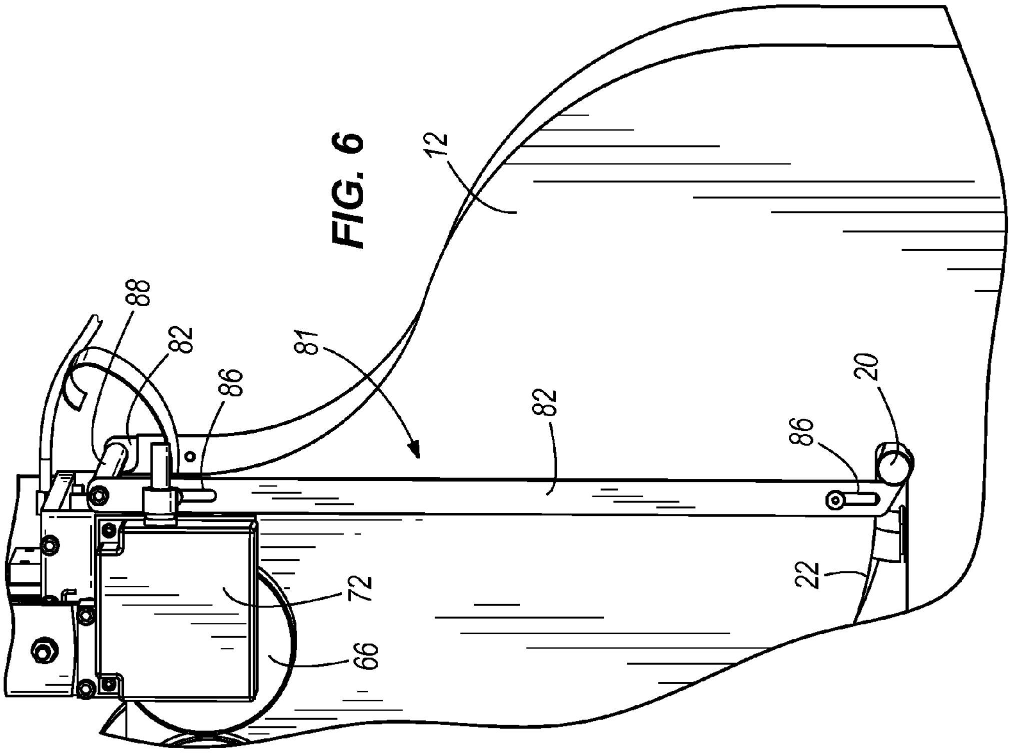
FIG. 6 is a magnified view of the locking mechanism for the reel of terminals.

Referring now to FIGS. 1 and 6, the terminal reel cart 10 includes a locking mechanism 81 to hold the terminal reel 16 in the slot 22. The locking mechanism 81 includes a locking bar 82 positioned on each side of the support body 12. Each of the locking bars 82 is supported by an upper connector 83 and a lower connector 84. The upper and lower connectors 83, 84 are each movably received within a slot 86 formed in the support bar 82. The slots 86 allow the locking bar 82 to move vertically. In the position shown in FIG. 6, each of the connectors 83, 84 are at the upper end of the slots 86 such that the locking bars 82 hold the shaft 20 within the slot 22.

As shown in FIG. 6, a handle 88 extends between the pair of locking bars 82 such that the locking bars 82 on each side of the terminal reel cart can be removed together through movement of the handle 88.

As can be understood in FIG. 1, each reel cart 10 includes a supply of terminals and an applicator mounted to the mounting plate 28. Thus, when a user desires to change out the type of terminals and applicators used in a wire processing system, the entire reel cart 10 can be moved to the wire processing system as a single unit. Once the terminal reel cart 10 is in the required location, the terminal applicator is removed from the mounting plate 28 and locked into place in the wire processing system. In the embodiment shown in FIG. 2, the magnetic support 30 allows for simple and quick removal of the applicator from the terminal cart 10.

Referring now to FIG. 5, when the terminal reel cart 10 is wheeled into position, a drive wheel 66 of a drive motor 72 mounted to the wire processing system 68 frictionally engages the drive wheel 58. In the embodiment illustrated, the motor 72 is mounted to the table 70 by a mounting mechanism that allows the position of the motor 72 to move to compensate for the location of the wheel 58. The flexible mounting arrangement of the drive motor 72 allows the drive motor 72 to move and compensate for misalignment of the reel cart 10 to the table of the wire processing system.

When the terminal cart 10 is in the position shown in FIG. 5, the interaction between the drive wheel 66 and the drive wheel 58 causes the drive wheel 58 to rotate the paper take up reel to collect the paper backing of the terminals, as described.

Figure 7:
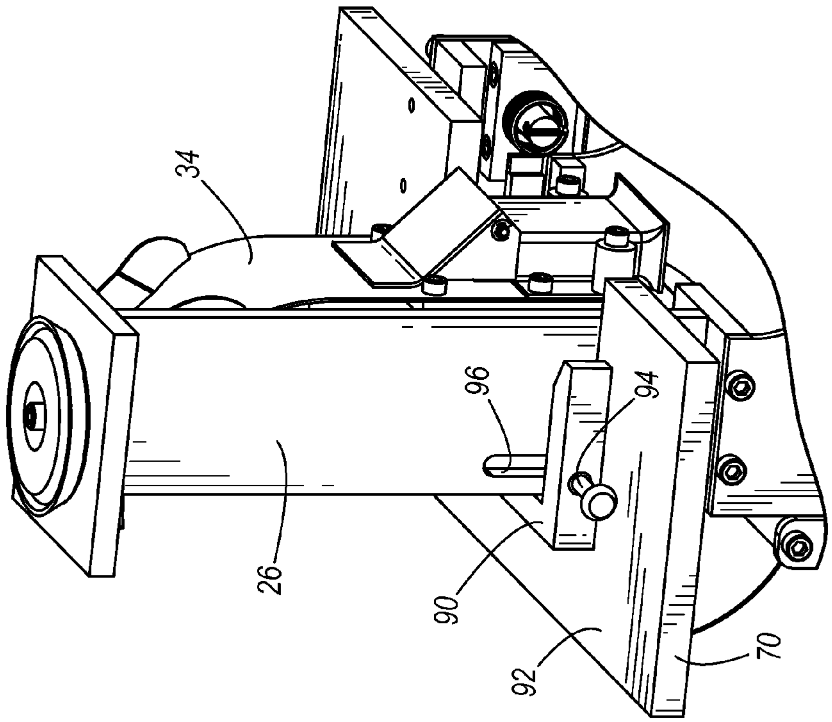
FIG. 7 is a perspective view of the connection between the terminal reel cart and a support table of the wire processing system.

When the terminal reel cart is positioned adjacent to the wire processing system, a clamping mechanism 90 can be used to secure the terminal reel cart in the position shown in FIG. 7. The clamping mechanism 90 is securely attached to the top surface 92 of the table 70. The clamping mechanism 90 includes a pin 94 that extends through an attachment slot 96 formed in the vertical bracket 26. The attachment slot 96 allows each of the terminal carts to be used with different height support tables 70.

In the embodiment shown in the drawing Figures, the paper take up reel 46 is shown in rotating communication with the drive wheel 58. As described, the drive wheel 58 engages a drive wheel 66 included as part of the wire processing system. Such an embodiment allows for a single drive motor 72 to be included as part of the wire processing system. The single drive motor 72 is used to rotate the paper take up reel for multiple different terminal reel carts. However, it is contemplated that in other embodiments, a drive motor could be mounted directly to the terminal reel cart and used to drive the paper take up reel 46. In such an embodiment, the operation of the drive motor contained on the terminal reel cart would be driven based upon the speed at which terminals are applied and removed from the support reel contained on the terminal reel cart.

I claim:

1. A terminal reel cart for supporting a reel of a continuous strip of terminals and a terminal applicator for use with a wire processing system, comprising:

a support body having a plurality of wheels and a pair of spaced sidewalls;

a support shaft extending between the spaced sidewalls to rotatably support the reel of terminals;

a mounting plate extending above the support body to support the terminal applicator on the terminal reel cart above the reel of terminals when the reel of terminals is rotatably supported by the support shaft;

a paper take up reel rotatably mounted to one of the sidewalls; and a terminal guide rotatably mounted to the support body and positioned to receive and support the continuous strip of terminals.

2. The terminal reel cart of claim 1 wherein each of the spaced sidewalls includes a receiving slot that receives the support shaft.

3. The terminal reel cart of claim 2 further comprising a locking mechanism positioned to retain the support shaft within the receiving slots.

4. The terminal reel cart of claim 3 wherein the locking mechanism includes a pair of locking bars selectively movable to retain the support shaft in the receiving slots and release the support shaft from within the receiving slots.

5. The terminal reel cart of claim 1 further comprising a drive wheel coupled to the paper take up reel by a drive shaft, wherein rotation of the drive wheel rotates the paper take up reel through the drive shaft.

6. The terminal reel cart of claim 5 further comprising a clutch mechanism positioned between the drive shaft and the drive wheel.

7. The terminal reel cart of claim 1 wherein the mounting plate includes a magnet.

8. The terminal reel cart of claim 1 further comprising a switch mechanism mounted to the terminal guide to generate a signal based on the presence of a strip of terminals on the terminal guide.

9. A terminal reel cart for use with a wire processing system, comprising:

a support body having a plurality of wheels and a pair of spaced sidewalls;

a support shaft extending between the pair of spaced sidewalls;

a reel of terminals connected to each other in a continuous strip, the reel of terminals being rotatably supported on the support shaft;

a mounting plate extending above the support body;

a terminal applicator supported on the mounting plate;

a paper take up reel rotatably mounted to one of the sidewalls; and a terminal guide rotatably mounted to the support body and positioned to receive and support the strip of terminals.

10. The terminal reel cart of claim 9 wherein each of the spaced sidewalls includes a receiving slot that receives the support shaft.

11. The terminal reel cart of claim 10 further comprising a locking mechanism positioned to retain the support shaft within the receiving slots.

12. The terminal reel cart of claim 11 wherein the locking mechanism includes a pair of locking bars selectively movable to retain the support shaft in the receiving slots and release the support shaft from within the receiving slots.

13. The terminal reel cart of claim 9 further comprising a drive wheel coupled to the paper take up reel by a drive shaft, wherein rotation of the drive wheel rotates the paper take up reel through the drive shaft.

14. The terminal reel cart of claim 13 further comprising a clutch mechanism positioned between the drive shaft and the drive wheel.

15. The terminal reel cart of claim 9 wherein the mounting plate includes a magnet.

16. The terminal reel cart of claim 9 further comprising a switch mechanism mounted to the terminal guide to generate a signal based on the presence of a strip of terminals on the terminal guide.

17. The terminal reel cart of claim 9 wherein the strip of terminals is received in the terminal applicator when the terminal applicator is supported on the mounting plate.

* * * * *